(12) United States Patent
Solow

(10) Patent No.: US 7,394,351 B2
(45) Date of Patent: Jul. 1, 2008

(54) DISPLAY ASSEMBLY WITH HORN CONFIGURATION FOR VEHICLE

(75) Inventor: Stanley Solow, Plainview, NY (US)

(73) Assignee: Wolo Manufacturing Corp., Deer Park, NY (US)

( * ) Notice: Subject to any disclaimer, the term of this patent is extended or adjusted under 35 U.S.C. 154(b) by 278 days.

(21) Appl. No.: 11/359,226

(22) Filed: Feb. 22, 2006

(65) Prior Publication Data
US 2007/0194891 A1 Aug. 23, 2007

(51) Int. Cl.
  B60R 25/10 (2006.01)
  B60Q 1/00 (2006.01)
  B60Q 1/22 (2006.01)
  B60Q 1/26 (2006.01)
  B60Q 1/52 (2006.01)
  F21V 19/02 (2006.01)
  G09G 3/32 (2006.01)
  G09G 3/34 (2006.01)

(52) U.S. Cl. ............................ 340/426.23; 340/426.22; 340/461; 340/463; 340/468; 340/471; 340/474; 340/479; 362/487; 362/491; 362/523; 362/540; 362/542; 362/800; 362/812; 345/82; 345/84

(58) Field of Classification Search ......... 340/459–479, 340/426.22, 426.23; 362/800, 812, 487, 362/491, 523, 540–542; 345/82, 84
See application file for complete search history.

(56) References Cited

U.S. PATENT DOCUMENTS

| 4,631,516 A | * | 12/1986 | Clinker | 340/464 |
| 5,132,666 A | * | 7/1992 | Fahs | 340/468 |
| 6,025,778 A | * | 2/2000 | Dietz et al. | 340/463 |
| 6,252,519 B1 | * | 6/2001 | McKenna | 340/902 |
| 6,271,814 B1 | * | 8/2001 | Kaoh | 345/82 |
| 6,515,583 B1 | * | 2/2003 | Lamparter et al. | 340/433 |
| 6,952,162 B2 | * | 10/2005 | Monck et al. | 340/464 |
| 6,963,275 B2 | * | 11/2005 | Smalls | 340/473 |
| 6,977,584 B2 | * | 12/2005 | Milliken | 340/468 |
| 7,164,350 B2 | * | 1/2007 | Ferrone et al. | 340/463 |

* cited by examiner

Primary Examiner—George A Bugg
Assistant Examiner—Lam P Pham
(74) Attorney, Agent, or Firm—Lackenbach Siegel, LLP

(57) ABSTRACT

A signal assembly mountable to an exterior of a vehicle is configured with a light-generating unit operable to emit a visually perceptible signal, and with a sound-generating unit operable to generate a sound signal. The light and sound generating units are coupled to one another to form a unitary assembly.

4 Claims, 4 Drawing Sheets

DISPLAY ASSEMBLY WITH HORN CONFIGURATION FOR VEHICLE

BACKGROUND OF THE INVENTION

1. Field of the Invention

The invention is directed generally to a vehicle warning signal system assembly and, particularly, to a signal assembly having light and sound generating signal units coupled together to form a unitary structure.

2. Related Art Discussion

Light systems may be utilized in conjunction with many different types of vehicles such as vans, trucks, ambulances, tow trucks, utility trucks, maintenance trucks, as well as other vehicles which may benefit from an improved warning light system. Similarly, sound warning systems are an indispensable vehicle accessory improving traffic safety.

A variety of configurations of both light and sound warning signal systems are known in the art. Some of the known sound systems have a horn configuration. For example, digital horns are disclosed by U.S. Pat. No. 6,489,885 fully incorporated herein by reference. A sound generating horn system is typically known for its distinct sound. It is not unusual for a truck or car to have this system installed. However, typically, the horn system may not be space-effective.

At least some of the known light systems are provided with a visual display carrying important insignia. For example, the above mentioned U.S. Pat. No. 6,489,885 discloses the use of lights for the displaying purposes. However, at least some of the known display systems may not be conspicuously positioned. Others are configured so that a display occupies a lot of precious space, as disclosed, for example, by U.S. Pat. No. 4,912,454, which is also incorporated herein by reference.

It is, therefore, desirable, to provide a display assembly generating a light signal and provided with a horn configuration.

Another need exists for a signal assembly operable to generate light and sound signals that is conspicuously positioned on a vehicle.

Still another need exists for a signal assembly operable to generate light and sound signals that has a modular structure including a sound and light generating units.

A further need exists for a signal assembly provided with sound and light generating units that are detachably coupled to one another to form a modular structure that can be easily assembled, installed and maintained.

SUMMARY OF THE INVENTION

These needs are met by the inventive signal assembly associated with a vehicle and having a simple, easily assembleable modular structure. The inventive signal assembly provides for generating sound and visual signals distinctly heard and clearly visible by drivers of other vehicles. Additionally, the inventive signal assembly is characterized by offering a highly visible display component operable to display various insignia which may include visual warning signals, advertising and instructional material.

In accordance with one embodiment of the invention, a signal assembly is configured with a visual signal generating unit operable to generate a visually perceptible signal, and a sound generating unit operable to generate a sound signal. The visual and sound signal generating units are coupled to one another to provide a unitary assembly easily mountable to a vehicle. The unitary assembly is installation and maintenance friendly and space effective.

The visual signal generating unit includes a housing coupleable to a vehicle and providing a support for the sound signal generating unit. The housing is configured to have an insignia display region facing rearwards and conveniently seen by pedestrians and drivers of other vehicles. The context displayed on the display region provides for an additional safety feature in combination with a sound signal. The visual warning signal may be realized by, for example, flashing a warning signal when the truck is in a reverse mode. Alternatively, the display region may be used for exhibiting a brand name or any other advertisement material.

In accordance with another embodiment of the invention, the visual generating unit may include a plurality of light generating elements mounted in the housing of the visual signal generating unit. Advantageously, the light elements are an array of light emitting diodes (LEDs) arranged to delimit the insignia display region so as to allow insignia to be immediately identified. Alternatively, the light generating elements may be a combination of LEDs and incandescent lamps. In one aspect of this embodiment, the light generating elements may be turned on simultaneously and provide a well defined frame delimiting the insignia display region. In a further aspect of this embodiment, the light generating elements may be selectively driven to form a running strip of lights realized by sequentially turning on consecutive elements. In still a further aspect associated with this embodiment, the light generating elements are of different colors and may be automatically turned on depending on ambient light and/or mode of operation of a vehicle. Another feature of this embodiment allows the intensity of the light generating elements to be controlled.

In accordance with a further embodiment of the invention, the sound generating unit includes an air horn assembly configured with one or multiple trumpets which are supported by the housing of the inventive light generating unit. Alternatively, the sound generating unit may include an electrically operated horn assembly.

BRIEF DESCRIPTION OF THE INVENTION

The above and other features of the present invention will become more readily apparent from the following detailed description provided in conjunction with the following drawings, in which.

DETAILED DESCRIPTION OF THE INVENTION

Figure 1:
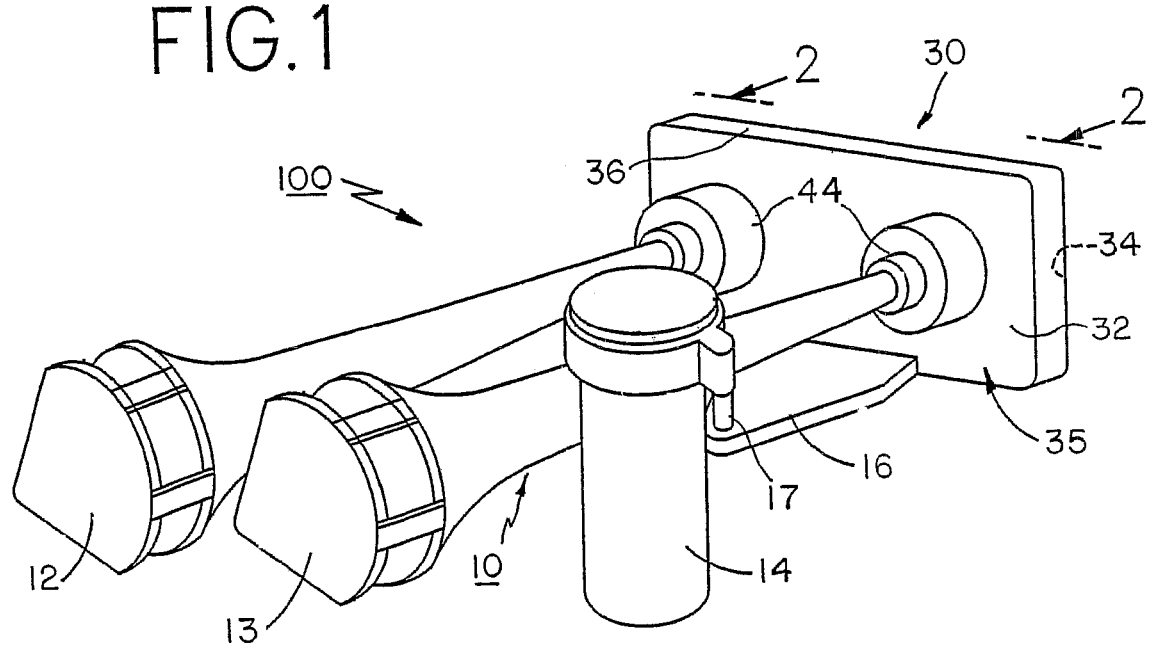
FIG. 1 is a perspective view of the inventive signal generating assembly configured with light and sound generating units.

Reference will now be made in detail to several views of the invention that are illustrated in the accompanying drawings. Wherever possible, same or similar reference numerals are used in the drawings and the descriptions to refer to the same or like parts or steps. The drawings are in simplified form and are not to precise scale. For purposes of convenience and clarity only, directional terms, such as top, bottom, rear and front may be used with respect to the drawings. These and similar directional terms should not be construed to limit the scope of the invention in any manner. The words "connect,"

"couple," and similar terms with their inflectional morphemes do not necessarily denote direct and immediate connections, but also include connections through mediate elements or devices.

Referring to FIG. 1, a signal assembly 100 is operable to generate visual and sound signals and is preferably associated with trucks, although other vehicle types including, but not limited to, passenger cars, vans and buses can be equipped with the inventive signal assembly. The signal assembly 100 includes a sound generating unit 10 and a light generating unit 30. Coupled together, light and sound generating units 10 and 30 form a unitary structural assembly mountable to a vehicle (not shown), as is explained below.

The sound generating unit 10, as shown in FIG. 1, has an air-horn configuration. The sound generating unit includes a compressor 14 containing a medium, such as air, and is controllably actuated from a cabin. The compressor 14 is configured with a line 17 providing flow communication between compressor 14 and at least one or more trumpets 12 and 13 depending on the specific configuration of sound generating unit 10. In response to a control signal generated by a driver, a pressurized medium enters trumpets 12, 13 each provided with a sound-generating membrane, as known to those of ordinary skill in the art of air horns. While traversing trumpets 12, 13, the medium actuates the membrane to generate a sound signal. Although FIG. 1 illustrates the air horn sound generating unit, other configurations of a sound unit including, for example, electrically-operated horns are contemplated within the scope of the invention. An electrically operated horn may be controlled by an on-board computer and have the predetermined duration of a sound signal as well as a sequence of sound signals, as disclosed in U.S. Published Application 2002/014,965 which is incorporated herein by reference.

The sound generating unit 10 may be installed at any convenient location on the vehicle's exterior. The trumpets 12, 13 and compressor 14 are coupled together by means of a support bracket 16 that can be mounted to the vehicle by any conventional means including, but not limited to, bolts, screws, pins and the like. The bracket 16 may be coupled to light generating unit 30. To provide signal assembly with a simple, easily installable and maintainable structure, rear ends of trumpets 12 and 13 are supported by light generating unit 30 as will be apparent from the following description.

The light generating unit 30 is operable to provide a visually perceptible signal and comprises a housing 35 that may have a variety of forms and shapes. As an example, FIG. 1 illustrates housing 35 having a rectangularly shaped cross-section. The housing 35 has a front wall 32, a rear wall 34 and a side wall 36 that may have rounded edges. The front and rear walls 32 and 34, respectively, are spaced from one another to define an inner compartment shaped and dimensioned to receive a plurality of light generating elements, which will be described in detail below.

The front wall 32 of housing 35 is configured to support the rear ends of trumpets 12 and 13. A pair of fittings 44 may be formed integrally with or detachably coupled to front wall 32 and configured to detachably receive the rear ends of trumpets 12 and 13 of sound unit 10. Alternatively, fittings 44 each may be fixed to or detachably coupled to the rear end of trumpets 12 and 13. The support bracket 16 of sound generating unit 10 may be fixed to housing 35 or detachably connected. The coupled sound and light generating unit 10 and 30, respectively, can be preassembled to form signal assembly 100 that can be subsequently mounted to a vehicle in a simple manner. Having a modular structure, assembly 100 can be easily maintained, and, if necessary, each of the signal and sound units can be separately dismounted, repaired or replaced.

The housing 35 may be made from, for example, polymeric materials and, preferably, be waterproof to preserve the operability of light generating unit 30 during inclement weather conditions. The walls of housing 35 are detachably coupled to one another so as to allow an easy access into the housing if, for instance, any of light generating elements is to be replaced. Alternatively, housing 35 may have a single, relatively thick front wall 32 and side wall 36 which extends rearwards from the front wall 32 and defines a peripheral edge delimiting the inner space of housing 35.

Figure 2:
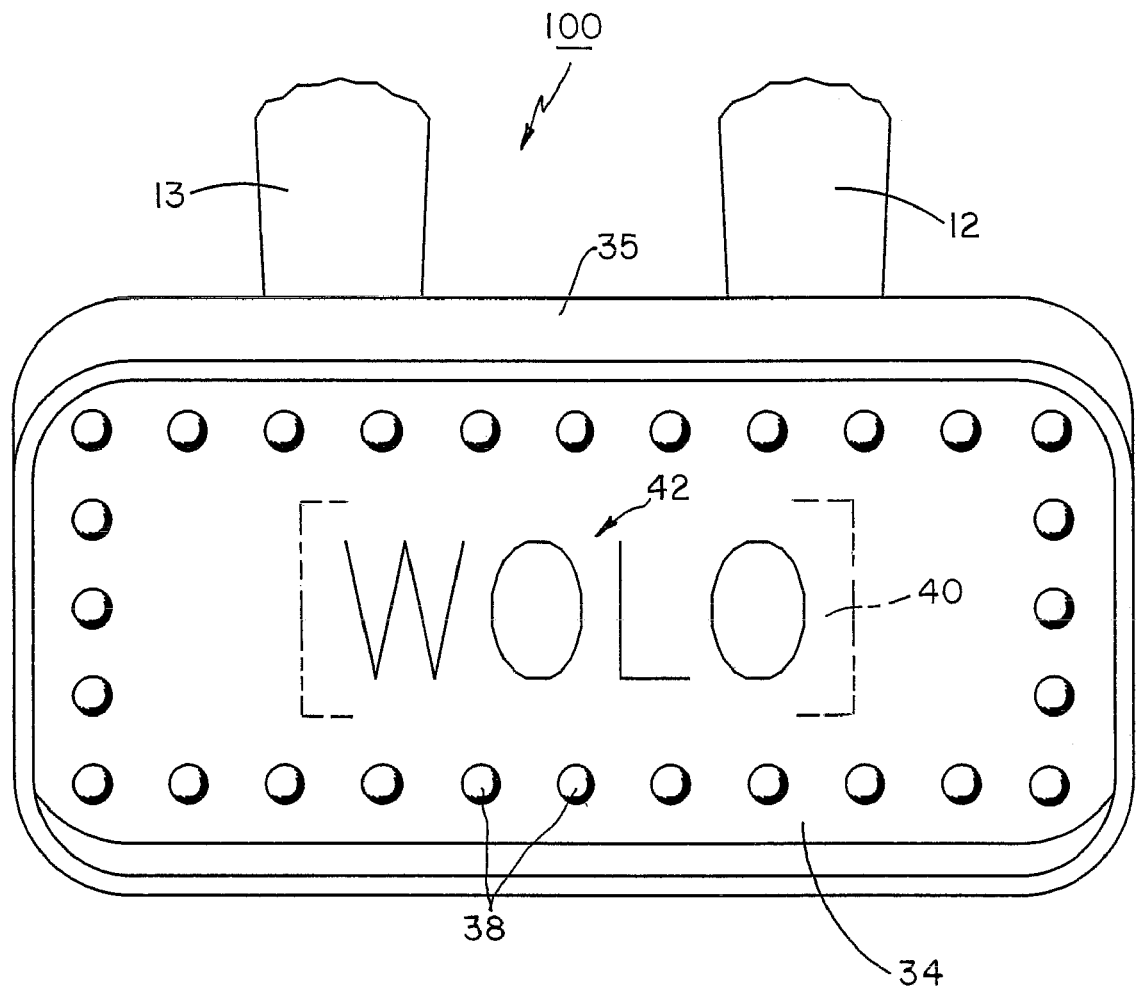
FIG. 2 is an elevated rear view of the light generating unit of FIG. 1.

FIG. 2 illustrates a plurality of light generating elements including, in accordance with one embodiment of the invention, multiple LEDs 38. The LEDs 38 are arranged along the inner periphery of housing 35 to delimit an insignia display region 40. The region 40 is defined on the rear wall and may be used for displaying an alpha numerical message 42. For example, message 42 may include a brand name, such as WOLO, which is shown in FIG. 2. In addition, a telephone number or e-mail address may be displayed as well. Alternatively, region 40 may have an instructional message, for example, "no tailgating". In a further embodiment, a warning sign may appear on insignia display region 40 when, for example, a vehicle is in a reverse mode, as will be discussed below.

Preferably, housing 35 or at least its rear wall 34 is made from transparent material allowing message 42 to be easily seen from a distance. The message 42 may be written by fluorescent paints to be highly visible at night. Preferably, an arrangement of light elements, when turned on, are arranged to define message 42. For instance, incandescent bulbs (not shown) may be placed between front and rear walls 32, 34, respectively, to have message 42 lit from inside. To further improve visibility of message 42, the inner surface of front wall 32 of housing 35 can be covered by a reflective layer.

Alternatively or in combination with incandescent bulbs, LEDs may be used to generate message 42. However, other configurations for creating a visible message, such as neon signs, may be implemented within the scope of this invention as will be evident for those of ordinary skill in the art of signs.

To direct viewer's attention to message 42, light generating elements 38 may have colors differing from that one of message 42. Preferably, light generating elements 38 have different colors. For example, some of elements 38 may be green, others red and still others blue. The light generating elements 38 may continuously emit light once they have been turned. Alternatively, the turning of elements 38 may be sequentially controlled: each subsequent element 38 goes on immediately after the preceding element is turned off. Similarly, the array of elements 38 may be divided in several groups each of which is turned on and off asynchronously with any other group. The turning sequence can be controlled by software executed by an on-board processor, as will be explained below.

In addition to controlling the turning sequence of elements 38, the element's intensity can be monitored and controlled as well by an on-board processor. In this case, depending on ambient light or a control signal by the driver, elements 38 may generate video signals having controllably variable intensity.

Figure 3:
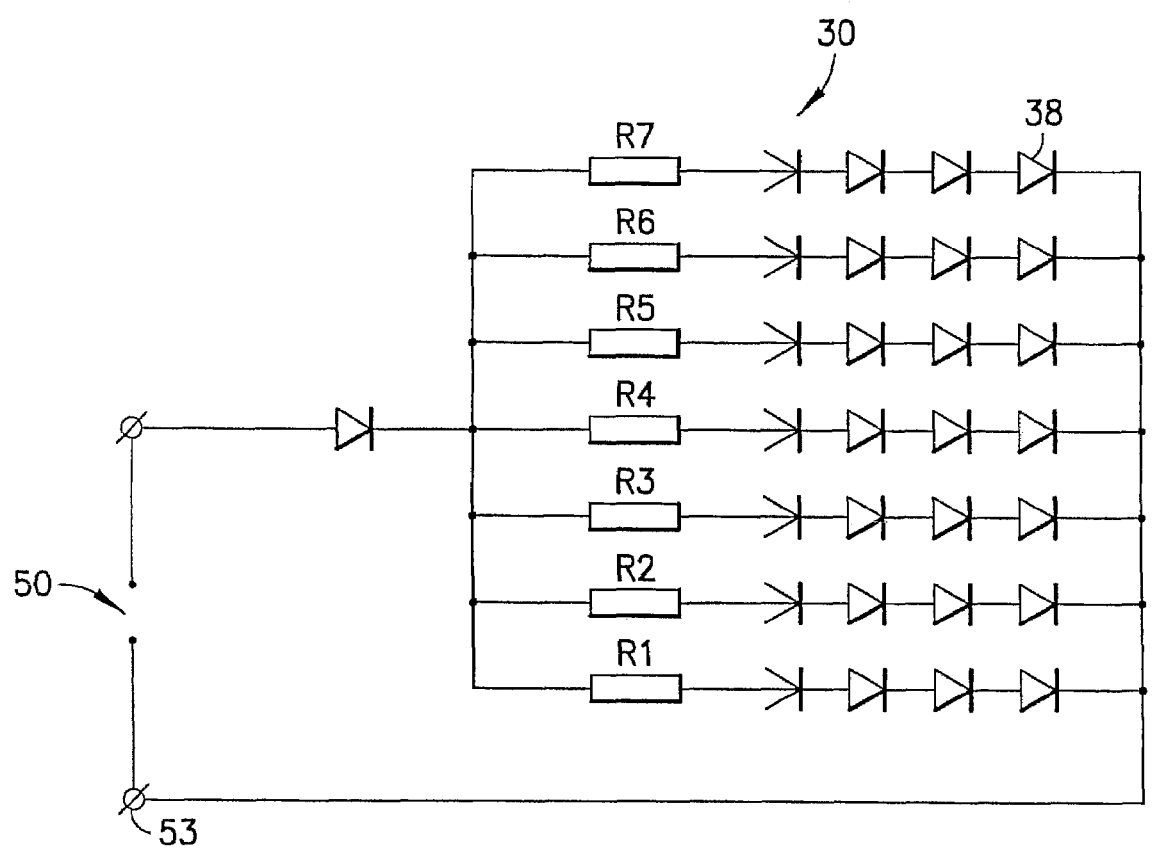
FIG. 3 is an exemplary circuitry implemented in the light generating unit of FIGS. 1 and 2.

As shown in FIG. 3, light generating elements can be turned on and off by a switch 50 powered by a power source 53 which can be associated with a battery. The circuitry is greatly simplified and may have numerous configurations easily designed by those of ordinary skill in the art of electrical circuitry. The battery is also operable to power sound generating unit 10 by being coupled to a horn compressor switch in the cabin of the vehicle which, in turn, is coupled to compressor 14 (FIG. 1).

Figure 4:
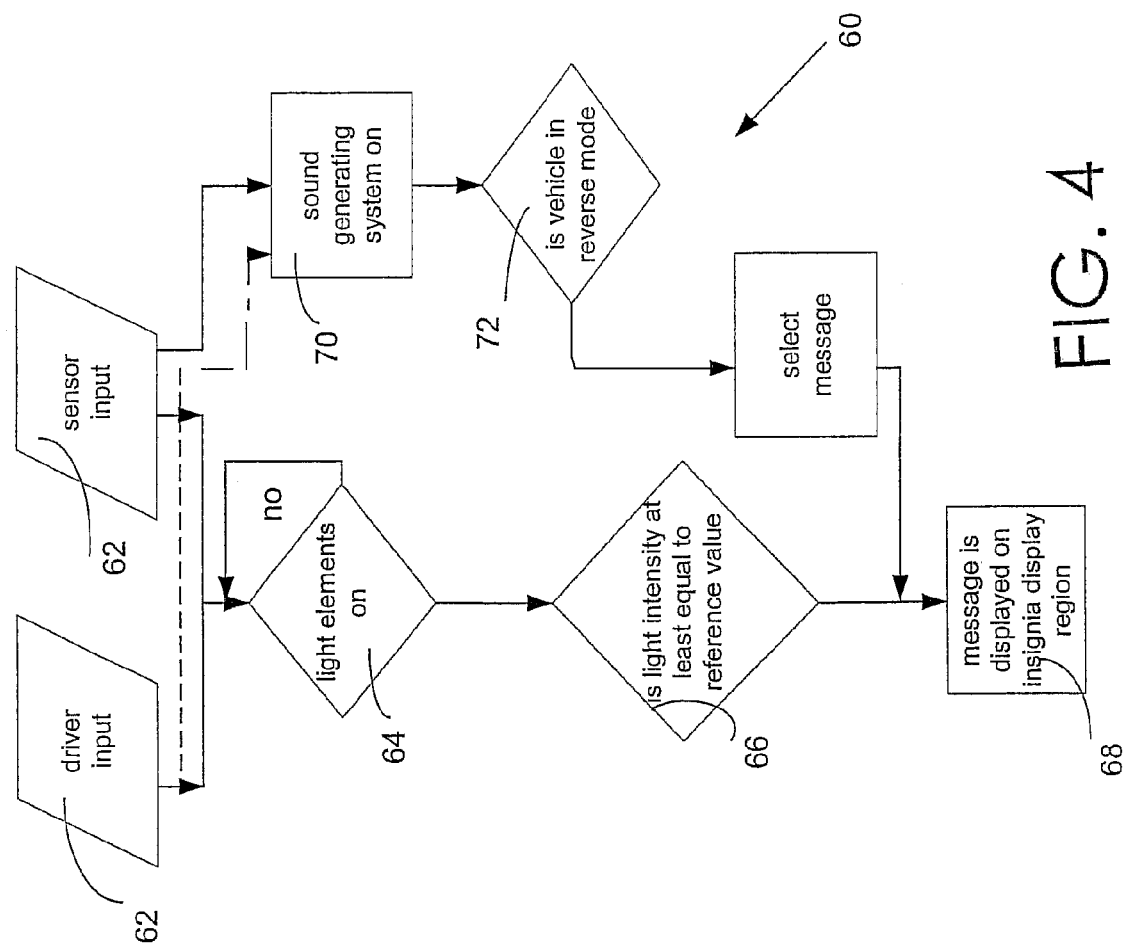
FIG. 4 is a diagrammatic representation of an on board processor associated with the inventive signal system of FIG. 1.

FIG. 4 illustrates an example of an on-board processor 60 operable to control the sound and light generating units 10 and 30, respectively. In response to the driver's input as shown by a step 62, software executed by processor 60, powers elements 18, as shown by a step 64. Alternatively, a variety of sensors, such as photo-diodes (not shown), may sense ambient light so as generate a control signal processed by processor 60 to opterate elements 38 if the control signal corresponds to a stored reference value. Depending on the magnitude of the control signal, software executed by processor 60 may further adjust intensity and, if necessary, select an operational sequence of elements 38, as shown in a step 66. In addition, software executed by processor 60 may further select the desired arrangement of light generating components which, when lit up, may define appropriate message 42, as illustrated by a step 68.

As mentioned above, a variety of alpha-numerical contexts of message 42 may be generated on insignia display region 40 (FIG. 2). One of possible situations that may require a specific context of message 42 is illustrated in FIG. 4 and is associated with a reverse mode of vehicle's operation. As the vehicle is put in a reverse gear, an appropriate sensor sensing the reverse operation generates a pilot signal processed by processor 60. In response, software executed by processor 60 outputs an input signal automatically activating sound generating unit 10, as illustrated by a step 70. Upon verifying that the vehicle is indeed in a reverse mode of operation, as indicated by a step 72, software executed by processor 60 generates another signal turning light generating elements 38, selecting the desired sequence and further selecting the desired warning signal, as illustrated by steps 66 and 68.

The specific features described herein may be used in some embodiments, but not in others, without departure from the spirit and scope of the invention as set forth. Many additional modifications are intended in the foregoing disclosure, and it will be appreciated by those of ordinary skill in the art that in some instances some features of the invention will be employed in the absence of a corresponding use of other features. The illustrative examples therefore do not define the metes and bounds of the invention and the legal protection is afforded the appended claims.

What is claimed is:

1. A signal assembly for a vehicle, comprising:
   a light generating unit operable to emit a visually perceptible signal;
   a sound generating unit operable to generate a sound signal, wherein the light and sound generating units are coupled to one another to form a unitary assembly mountable to the vehicle,
   wherein the light generating unit comprises a housing mountable to the vehicle and a plurality of spaced apart light emitting diodes (LEDs) mounted to the housing and each generating the visual signal perceptible through a rear portion of the housing;
   wherein the sound generating unit comprises a compressor operable to pressurize a medium compressor, and a plurality of trumpets in flow communication with the compressor so as to generate the sound signal in response to actuation of the compressor, the trumpets each having a rear end supported by the housing of the light generating unit;
   wherein the sound generating unit further comprises a support bracket supporting the trumpets and the compressor and coupled to the housing;
   an on-board processor coupled to the driver circuitry of the light and sound generating units and operable to:
      actuate the sound generating unit when the vehicle is in a reverse gear,
      actuate the driver circuitry of the light generating unit in response to actuating the sound generating unit, and
      select an arrangement of the light components to form a warning context of the message on the display region when the vehicle is in the reverse gear.

2. The signal assembly of claim 1, wherein the support bracket is detachably or fixedly coupled to the housing of the light generating unit.

3. The signal assembly of claim 1, wherein the sound and light generating units are mounted to the exterior of the vehicle.

4. The signal assembly of claim 1, wherein the light and sound generating units comprise respective driver circuitries operable independently from one another, the light generating unit being configured with an insignia display region provided with an array of light components operable to define a context of a message on the display region.

* * * * *